US012779599B2

(12) United States Patent
Lamarra

(10) Patent No.: US 12,779,599 B2
(45) Date of Patent: Nov. 3, 2026

(54) WIRE BONDING SYSTEMS AND ARRAYS, AND RELATED METHODS

(71) Applicant: Kulicke and Soffa Industries, Inc., Fort Washington, PA (US)

(72) Inventor: Michael Christopher Lamarra, Harleysville, PA (US)

(73) Assignee: Kulicke and Soffa Industries, Inc., Fort Washington, PA (US)

( * ) Notice: Subject to any disclaimer, the term of this patent is extended or adjusted under 35 U.S.C. 154(b) by 0 days.

(21) Appl. No.: 19/204,772

(22) Filed: May 12, 2025

(65) Prior Publication Data

US 2025/0360581 A1 Nov. 27, 2025

Related U.S. Application Data

(60) Provisional application No. 63/650,997, filed on May 23, 2024.

(51) Int. Cl.
*B23K 20/00* (2006.01)
*B23K 37/047* (2006.01)

(52) U.S. Cl.
CPC .......... *B23K 37/047* (2013.01); *B23K 20/004* (2013.01)

(58) Field of Classification Search
CPC ............. H10W 72/0711; H10W 72/00; H10W 72/015; H10P 72/0446; H10P 72/00
See application file for complete search history.

(56) References Cited

U.S. PATENT DOCUMENTS

| | | | |
|---|---|---|---|
| 9,156,160 B2 | 10/2015 | Nagai et al. | |
| 11,550,303 B2 | 1/2023 | Canberi | |
| 2005/0284915 A1 | 12/2005 | Beatson et al. | |

FOREIGN PATENT DOCUMENTS

| | | |
|---|---|---|
| JP | 2014-176944 A | 9/2014 |
| KR | 10-2002-0057253 A | 7/2002 |
| KR | 10-2007-0094259 A | 9/2007 |

OTHER PUBLICATIONS

KR2007-0094259A computer English translation (Year: 2007).*
International Search Report for PCT application No. PCT/US2025/028344 completed Sep. 8, 2025.

* cited by examiner

*Primary Examiner* — Erin B Saad
(74) *Attorney, Agent, or Firm* — Christopher M. Spletzer, Sr.

(57) ABSTRACT

A wire bonding array is provided. The wire bonding array includes a plurality of wire bonding systems, each of the plurality of wire bonding systems including (i) an input workpiece handling system and (ii) a bond head assembly configured to carry a wire bonding tool. The wire bonding array also includes a robot configured to provide workpieces to the input workpiece handling system of each of the plurality of wire bonding systems, the robot including a carriage for moving with respect to the plurality of wire bonding systems, the carriage being positioned above a receiving portion of the input workpiece handling system.

20 Claims, 13 Drawing Sheets

WIRE BONDING SYSTEMS AND ARRAYS, AND RELATED METHODS

CROSS-REFERENCE TO RELATED APPLICATION

This application claims the benefit of U.S. Provisional Application No. 63/650,997, filed on May 23, 2024, the content of which is incorporated herein by reference.

FIELD

The invention relates to wire bonding systems and arrays including robots for loading and unloading workpieces, and related methods.

BACKGROUND

In the processing and packaging of semiconductor devices, wire bonding continues to be a primary method of providing electrical interconnection between two locations within a package (e.g., between a die pad of a semiconductor die and a lead of a leadframe). More specifically, using a wire bonder (also known as a wire bonding system) wire loops are formed between respective locations to be electrically interconnected. The primary methods of forming wire loops are ball bonding and wedge bonding. In forming the bonds between (a) the ends of the wire loop and (b) the bond site (e.g., a die pad, a lead, etc.) varying types of bonding energy may be used, including, for example, ultrasonic energy, thermosonic energy, thermocompressive energy, amongst others. Wire bonding systems are also used to form conductive bumps from portions of wire, and vertical wire structures (e.g., bonded at a single bond site).

Providing workpieces to wire bonding systems for wire bonding (i.e., "material handling") continues to be a resource-intensive component of semiconductor packaging. For example, material handling requires a substantial amount of factory floor space for safely facilitating access to each wire bonding system for a material handler (e.g., a person or a material handling robot) to provide and remove workpieces from each wire bonding system. Thus, it would be desirable to provide improved systems and methods for reducing the factory floor space required for facilitating material handling.

SUMMARY

According to an exemplary embodiment of the invention, a wire bonding array is provided. The wire bonding array includes a plurality of wire bonding systems, each of the plurality of wire bonding systems including (i) an input workpiece handling system and (ii) a bond head assembly configured to carry a wire bonding tool. The wire bonding array also includes a robot configured to provide workpieces to the input workpiece handling system of each of the plurality of wire bonding systems, the robot including a carriage for moving with respect to the plurality of wire bonding systems, the carriage being positioned above a receiving portion of the input workpiece handling system.

According to other embodiments of the invention, the wire bonding array recited in the immediately preceding paragraph may have any one or more of the following features: each of the plurality of wire bonding systems includes an output workpiece handling system, the robot being configured to remove workpieces from the output workpiece handling system; the input workpiece handling system is a magazine handler, and workpieces are provided by the robot in a magazine to the magazine handler; the robot is a multi-axis robot configured to grip the magazine prior to providing the magazine to the magazine handler; a robot support structure, the carriage being configured to move with respect to the plurality of wire bonding systems along the robot support structure; the robot support structure includes a rail; a workpiece source, the robot being configured to retrieve workpieces from the workpiece source, and then to provide workpieces to the input workpiece handling system of each of the plurality of wire bonding systems; and a footprint of the carriage overlaps a portion of a footprint of the plurality of wire bonding systems.

According to another exemplary embodiment of the invention, another wire bonding array is provided. The wire bonding array includes a plurality of wire bonding systems, each of the plurality of wire bonding systems including (i) an input magazine handler, (ii) an output magazine handler; and (iii) a bond head assembly configured to carry a wire bonding tool. The wire bonding array also includes a robot configured to (i) provide magazines including workpieces to the input magazine handler of each of the plurality of wire binding systems and (ii) remove magazines including workpieces from the output magazine handler, the robot including a carriage for moving with respect to the plurality of wire bonding systems, the carriage being positioned above a receiving portion of the input magazine handler. The wire bonding array also includes a robot support structure, the carriage being configured to move with respect to the plurality of wire bonding systems along the robot support structure.

According to other embodiments of the invention, the wire bonding array recited in the immediately preceding paragraph may have any one or more of the following features: the robot is a multi-axis robot configured to grip magazines to provide magazines including workpieces to the input magazine handler; the robot support structure includes a rail; and a workpiece source, the robot being configured to retrieve magazines including workpieces from the workpiece source, and then to provide magazines including workpieces to the input magazine handler of each of the plurality of wire bonding systems.

According to another exemplary embodiment of the invention, a wire bonding system is provided. The wire bonding system includes (i) an input workpiece handling system and (ii) a bond head assembly configured to carry a wire bonding tool. The wire bonding system also includes a robot configured to provide workpieces to the input workpiece handling system of the wire bonding system. The robot, or a carriage for moving the robot, is positioned above a receiving portion of the input workpiece handling system.

According to other embodiments of the invention, the wire bonding system recited in the immediately preceding paragraph may have any one or more of the following features: an output workpiece handling system, the robot being configured to remove workpieces from the output workpiece handling system; the input workpiece handling system is a magazine handler, and workpieces are provided by the robot in a magazine to the magazine handler; the robot is a multi-axis robot configured to grip the magazine prior to providing the magazine to the magazine handler; a robot support structure, the carriage being configured to move with respect to the wire bonding system along the robot support structure; the robot support structure includes a rail; a workpiece source, the robot being configured to retrieve workpieces from the workpiece source, and then to provide workpieces to the input workpiece handling system of the wire bonding system; and a footprint of the carriage overlaps a portion of a footprint of the wire bonding system.

According to another exemplary embodiment of the invention, a method of operating a wire bonding array is provided. The method includes: (a) providing a plurality of wire bonding systems, each of the plurality of wire bonding systems including (i) an input workpiece handling system and (ii) a bond head assembly configured to carry a wire bonding tool; (b) moving a robot on a carriage with respect to the plurality of wire bonding systems, the carriage being positioned above a receiving portion of the input workpiece handling system; and (c) providing workpieces to the input workpiece handling system of each of the plurality of wire bonding systems using the robot.

According to other embodiments of the invention, the method recited in the immediately preceding paragraph may have any one or more of the following features: a step of removing workpieces from an output workpiece handling system of one of the plurality of wire bonding systems; a step of retrieving workpieces from a workpiece source with the robot prior to step (c); step (c) includes providing the workpieces in a magazine to the input workpiece handling system using the robot; the robot is a multi-axis robot; step (b) includes moving the carriage on a robot support structure, the carriage being configured to move relative to the plurality of wire bonding systems along the robot support structure; step (b) includes moving the carriage along a rail of the robot support structure; and step (b) includes moving the carriage such that a footprint of the carriage overlaps a portion of a footprint of the plurality of wire bonding systems.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

Figure 1A:
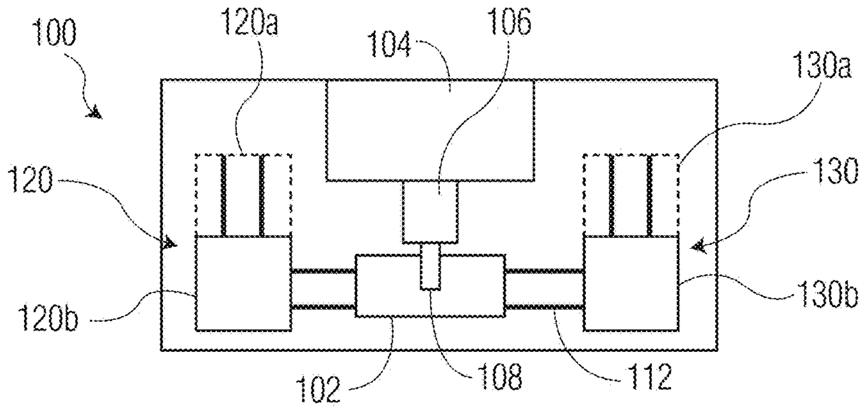
FIG. 1A PRIOR ART
FIGS. 1A and 1B are block diagram top views illustrating a conventional wire bonding system.

According to certain exemplary embodiments of the invention, automated handling of magazines (or other structures used to hold a plurality of workpieces) for use in wire bonding applications is provided. A robot (e.g., a 6-axis cobot) may be supported from above upper consoles of wire bonding systems (e.g., where the robot moves along a linear rail such as a rack and pinion system, where this rail may be considered a $7^{th}$ motion axis for the robot). Wire bonding systems may be placed back-to-back, with a robot support structure (e.g., the rail) being positioned above a gap between the wire bonding systems.

Aspects of the invention relate to a wire bonding array including an integrated workpiece source where magazines from adjacent processes (or from an inventory source) can be fed into or out of the wire bonding array. The robot may load/unload magazines to the wire bonding systems.

Aspects of the invention provide an efficient system/method for moving magazines to and from wire bonding systems with a minimal incremental footprint impact. Further, the robot (and the movement of the magazines) is isolated from space occupied by maintenance and operations personnel. Further still, the robot (e.g., including a cobot arm) may enable either front-loading or rear-loading of magazines into a wire bonding system.

Operation and monitoring of the robot (and the associated movement of magazines) may be controlled by local and/or remote computer system(s). That is, the entire process of moving workpieces (e.g., in magazines) may be an "intelligent" process. For example, magazines may be identified (e.g., using a bar code or similar identifier, using position information stored on a local/remote computer system, etc.), so that the robot can move magazines to an appropriate location (e.g., to/from an input workpiece handling system, to/from an output workpiece handling system, to/from a workpiece source, etc.).

As used herein, the term "wire bonding array" refers to a group of wire bonding systems (e.g., within a production environment, such as a factory). The term "wire bonding array" may include wire bonding systems of different types (e.g., wedge bonders and ball bonders), different model numbers, different manufacturers, different processes, etc. Further, a wire bonding array may include wire bonding systems having different functions within the array (e.g., wire bonding different types of wire, different types of workpieces, etc.). Further still, the term "wire bonding array" may include additional machines, systems, or arrays that support the wire bonding array (e.g., computers for monitoring and/or controlling a factory environment, maintenance stations, workpiece sources, metrology and/or inspection systems, etc.).

As used herein, the term "workpiece" refers to any structure configured for wire bonding. For example, traditional workpieces include, or may be configured to include, a semiconductor element. Exemplary semiconductor elements include a semiconductor die, an LED, etc. Exemplary structures including, or configured to include, a semiconductor element include a leadframe, another semiconductor die, a PCB, etc. Thus, an exemplary workpiece would include a semiconductor die disposed on a leadframe.

As used herein, the term "carriage" refers to a structure that carries a robot, for example, including a robotic arm (or other robotic grabbing mechanism) of the robot. In connection with the invention, a carriage is configured to move along some motion path (e.g., a rail, a surface, a cable, a track, a chain, etc.) while carrying the robot. A carriage may be integrated with the robotic arm or other robotic grabbing mechanism (e.g., they may be formed as a single structure, they may be coupled together-either directly or indirectly, they may be electrically integrated with one another through common power or controls, etc.), but it is not so limited. A carriage may include a motion system (or may be configured to interact with a motion system) for moving along a motion path. Exemplary components of a carriage include a platform, wheels, pulleys, treads, bushings, tracks, teeth, gears, or any other structure for moving along the motion path. In addition to carrying the robotic arm (or other robotic grabbing mechanism), a carriage may be configured to carry workpieces (and/or magazines including a plurality of workpieces).

As used herein, a "receiving portion" (e.g., receiving portion 120*a*, discussed herein) is the location on an input workpiece handling system at which an input workpiece handling system receives workpieces (e.g., a magazine of workpieces). The invention is not limited to any particular embodiment of an input workpiece handling system or receiving portion. Exemplary receiving portions may be toward the front, rear, or side of the machine relative to another portion of the input workpiece handling system. Further, exemplary receiving portions may be above, below, or at the same height relative to another portion of the input workpiece handling system. Other exemplary receiving portions may be contained within a main portion/processing portion of an input workpiece handling system. Similarly, a "buffer portion" is the location on an output workpiece handling system where workpieces (e.g., a magazine of workpieces) are placed to be removed from the output workpiece handling system. The "buffer portion" may be located anywhere relative to a main portion/processing portion of the output workpiece handling system in a similar manner as the receiving portion is positioned relative to the input workpiece handling system.

Figure 1B:
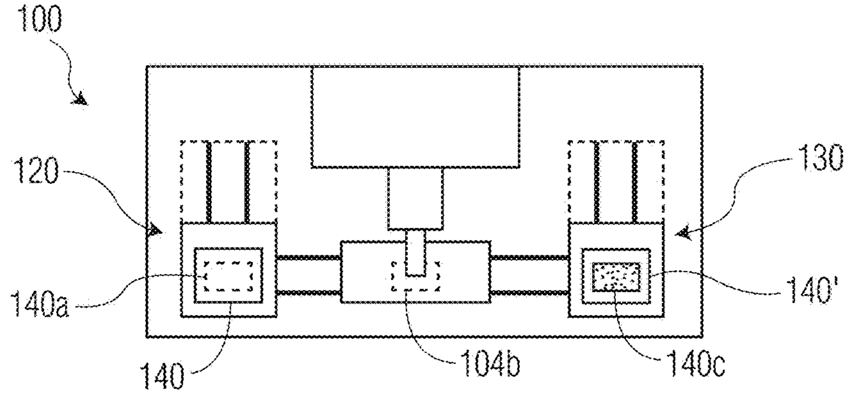
FIG. 1B PRIOR ART
Figure 1C:
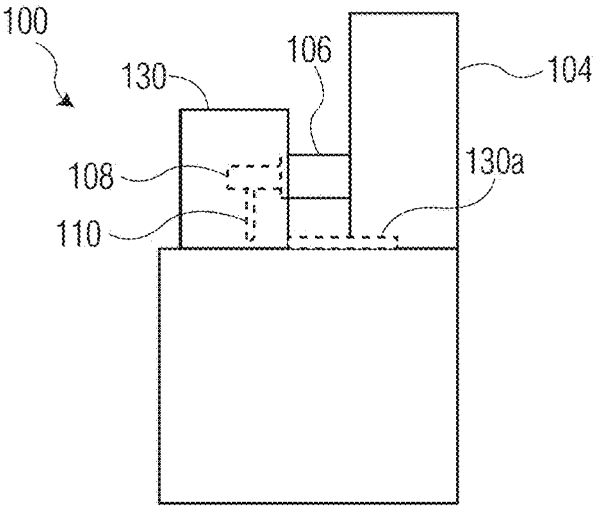
FIG. 1C PRIOR ART
FIG. 1C is a block diagram side view illustrating the conventional wire bonding system of FIGS. 1A-1B.

Referring now to FIGS. 1A-1C, a conventional wire bonding system 100 is illustrated in a simplified form. Wire bonding system 100 includes a support structure 102, an X-Y table 104, and a bond head assembly 106. Support structure 102 supports a workpiece (e.g., active workpiece 140*b*) during a wire bonding operation. X-Y table 104 carries bond head assembly 106 in an X-Y plane of wire bonding system 100. Bond head assembly 106 carries a transducer 108, which in turn carries a wire bonding tool 110 for bonding a wire to active workpiece 140*b*.

Wire bonding system 100 also includes various systems for moving workpieces within wire bonding system 100. In particular, wire bonding system 100 includes an input workpiece handling system 120 (e.g., a magazine handler), a material handling system 112, and an output workpiece handling system 130 (e.g., a magazine handler). Input workpiece handling system 120 stores an input magazine 140 during wire bonding operations. Input magazine 140 is configured to hold a plurality of unbonded workpieces 140*a*. Input workpiece handling system 120, in conjunction with material handling system 112, provides ones of the plurality of unbonded workpieces 140*a* to support structure 102 for wire bonding. At support structure 102, one of the plurality of unbonded workpieces 140*a* is now labeled as active workpiece 140*b* because it is being wire bonded using wire bonding tool 110 during the wire bonding operation. After the wire bonding operation is complete, material handling system 112 moves active workpiece 140*b* (now labeled as bonded workpiece 140*c*) to an output magazine 140' in output workpiece handling system 130.

Input workpiece handling system 120 includes a receiving portion 120*a* and a main portion 120*b*. Output workpiece handling system 130 includes a buffer portion 130*a* and a main portion 130*b*. In connection with the present invention, an external material handler (e.g., a material handling robot, an operator, etc.) moves magazines into, and out from, receiving portion 120*a* and buffer portion 130*a*, respectively (described in more detail in connection with FIGS. 4A-4H). After a magazine is moved into receiving portion 120*a* of input workpiece handling system 120, the magazine can be further loaded into main portion 120*b* of input workpiece handling system 120 (e.g., via a mechanism of input workpiece handling system 120). Workpieces can be moved from a magazine in main portion 120*b* to support structure 102 via material handling system 112 for wire bonding. After wire bonding, the workpieces are moved to a magazine in main portion 130*b* of output workpiece handling system 130. When the magazine is ready to be removed from output workpiece handling system 130 (e.g., the magazine is full of workpieces that have been wire bonded), the magazine can be moved from main portion 130*b* to buffer portion 130*a*. The magazine can be removed from buffer portion 130*a* by an external material handler.

A plurality of wire bonding systems (e.g., wire bonding system 100) are commonly used together in a factory setting. In such settings, there is typically space around each of the plurality of wire bonding systems to allow for material handlers (e.g., a human operator or a material handling robot) to access each wire bonding system. However, aspects of the invention are directed toward reducing the space between each of the plurality of wire bonding systems.

Figure 2A:
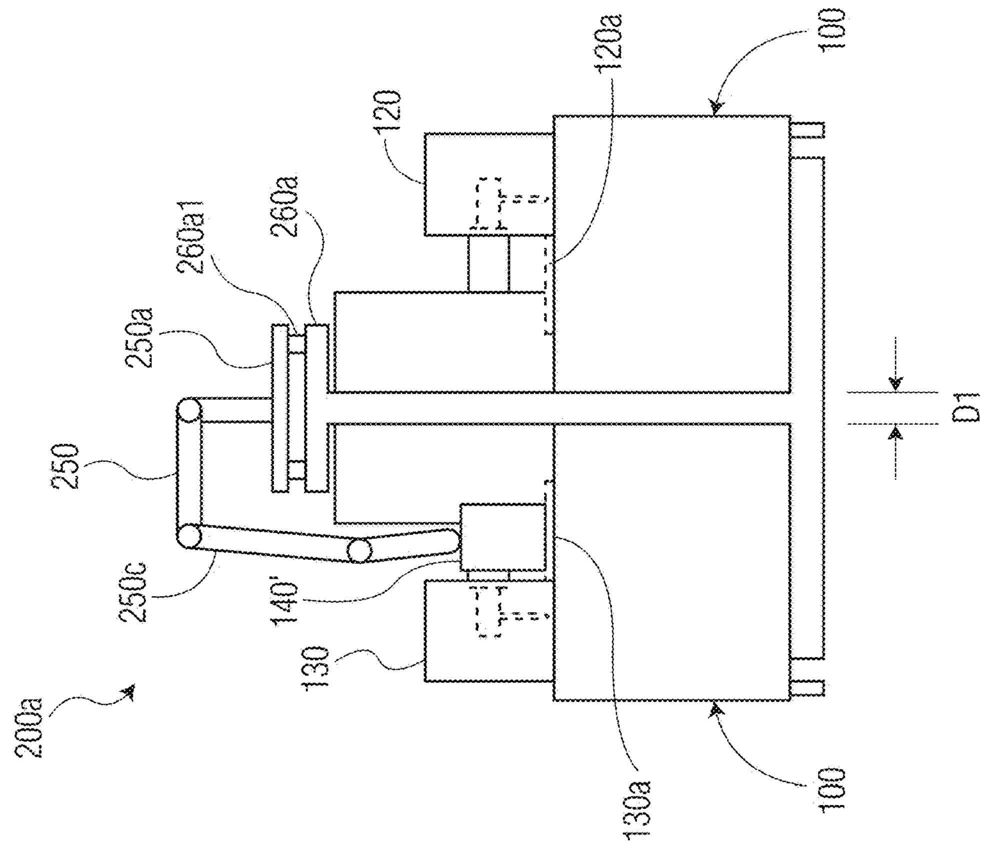
FIGS. 2A and 2B are block diagram side views illustrating wire bonding arrays in accordance with exemplary embodiments of the invention.

In FIG. 2A, a wire bonding array 200*a* includes a plurality of wire bonding systems 100 (e.g., wire bonding system 100 of FIGS. 1A-1C), a material handling robot 250, and a robot support structure 260*a*. In this exemplary embodiment of the invention, the plurality of wire bonding systems 100 are arranged back-to-back and are separated by a distance D1. Material handling robot 250, including a robotic arm 250*c* (or other robotic grabbing mechanism), is configured to provide workpieces (e.g., workpieces stored a magazine) to the input workpiece handling system of each of the plurality of wire bonding systems (e.g., material handling robot 250 provides workpieces in a magazine to input workpiece handling system 120). Material handling robot 250 may also be configured to remove workpieces from an output workpiece handling system using robotic arm 250*c* (e.g., wherein material handling robot 250 removes an output magazine 140' from output workpiece handling system 130). An exemplary material handling robot 250 would be a multi-axis robot (e.g., a 6-axis robot) that rides along a rail 260*a*1 (e.g., a 7th axis of material handling robot 250); however, the invention is not limited to such an example.

Material handling robot 250 includes a carriage 250*a* for carrying material handling robot 250 (e.g., including robotic arm 250*c*), relative to the plurality of wire bonding systems 100, along rail 260*a*1 of robot support structure 260*a*. Carriage 250*a* is above (e.g., directly above, indirectly above, above but offset from, etc.) at least a portion of each of the plurality of wire bonding systems 100. In the illustrated example, carriage 250*a* is above receiving portion 120*a* of input workpiece handling system 120 and buffer portion 130*a* of output workpiece handling system 130. Further, the footprint of carriage 250*a* at least partially overlaps the footprint of the plurality of wire bonding systems 100 (i.e., when viewed from above, carriage 250*a* covers part of the plurality of wire bonding systems 100). Carriage 250*a* is supported by robot support structure 260*a*. Robot support structure 260*a* is disposed between the plurality of wire bonding systems 100 and runs under the plurality of wire bonding systems 100 (e.g., robot support structure 260*a* has an "I" shape). In this arrangement, the distance D1 between the wire bonding systems is limited by the width of robot support structure 260*a*. It is contemplated that robot support structure 260*a* could include system connections for each of the plurality of wire bonding system 100 (e.g., power connections, data connections, etc.).

Figure 2B:
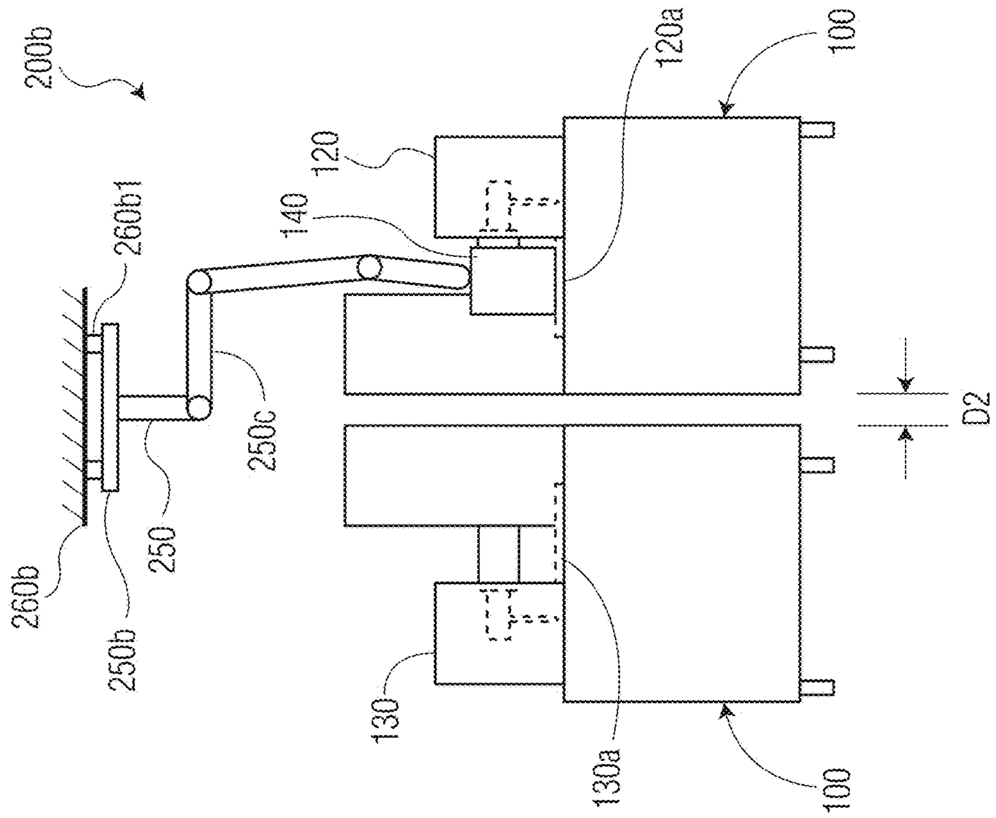

In FIG. 2B, a wire bonding array 200*b* includes a plurality of wire bonding systems 100, a material handling robot 250, and a robot support structure 260*b*. In this exemplary embodiment of the invention, pairs of the plurality of wire bonding systems 100 are arranged back-to-back and separated by a distance D2. Material handling robot 250 of FIG. 2B has the same capabilities as material handling robot 250 of FIG. 2A (e.g., wherein material handling robot 250 provides an input magazine 140 to input workpiece handling system 120). Material handling robot 250 of FIG. 2B may generally be the same as material handling robot 250 of FIG. 2A (e.g., including robotic arm 250*c*), except for the details of the carriage. Whereas carriage 250*a* is configured to be supported from below (e.g., by robot support structure 260*a*), a carriage 250*b* is configured to be supported from above by robot support structure 260*b*. Robot support structure 260*b* may be, for example, suspended from or integrated with a ceiling of the factory housing the plurality of wire bonding systems 100, integrated with a gantry, or supported by a cable-suspension system.

Carriage 250*b* carries material handling robot 250 relative to the plurality of wire bonding systems 100 along a rail 260*b*1 of robot support structure 260*b*. Carriage 250*b* is above at least a portion of the plurality of wire bonding systems 100. In particular, carriage 250*b* is above receiving portion 120*a* of input workpiece handling system 120. Further, the footprint of carriage 250*b* at least partially overlaps the footprint of the plurality of wire bonding systems 100 (i.e., when viewed from above, carriage 250*b* covers at least part of the plurality of wire bonding systems 100). In this arrangement, distance D2 may be reduced (as compared to distance D1) or may even be eliminated (e.g., each of the plurality of wire bonding systems 100 may be in contact with another wire bonding system in a back-to-back arrangement).

Figure 3A:
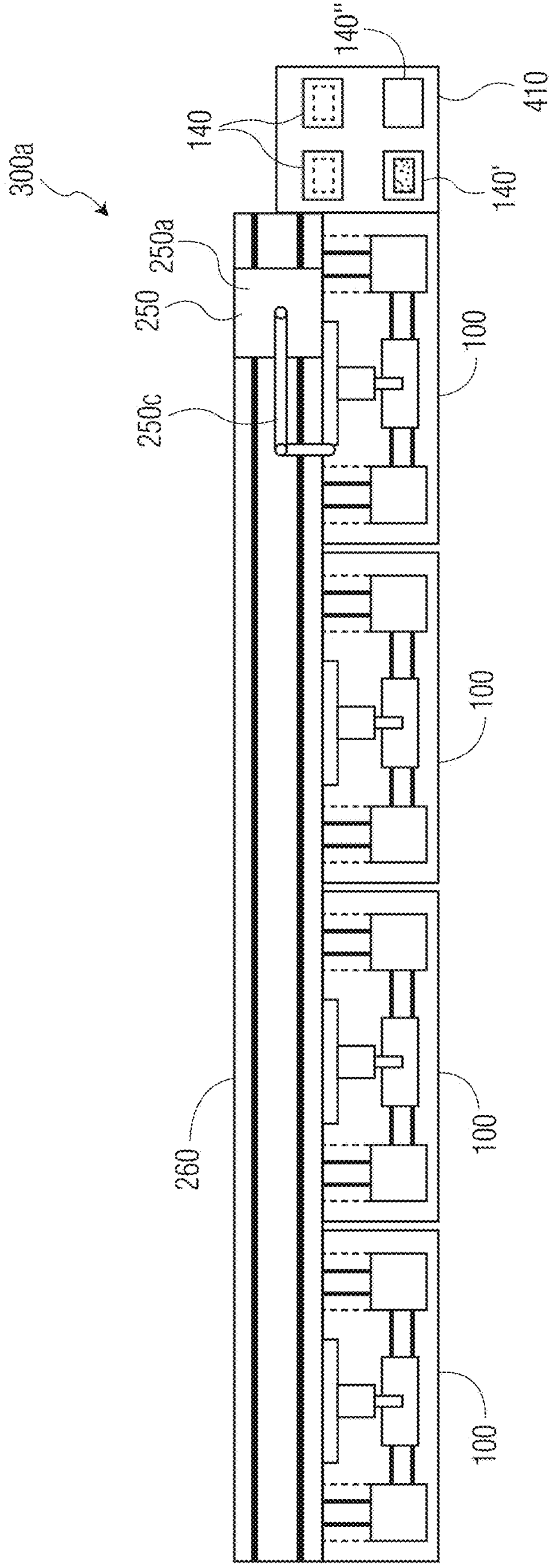
FIGS. 3A-3B are block diagram top views illustrating wire bonding arrays in accordance with additional exemplary embodiments of the invention.
Figure 3B:
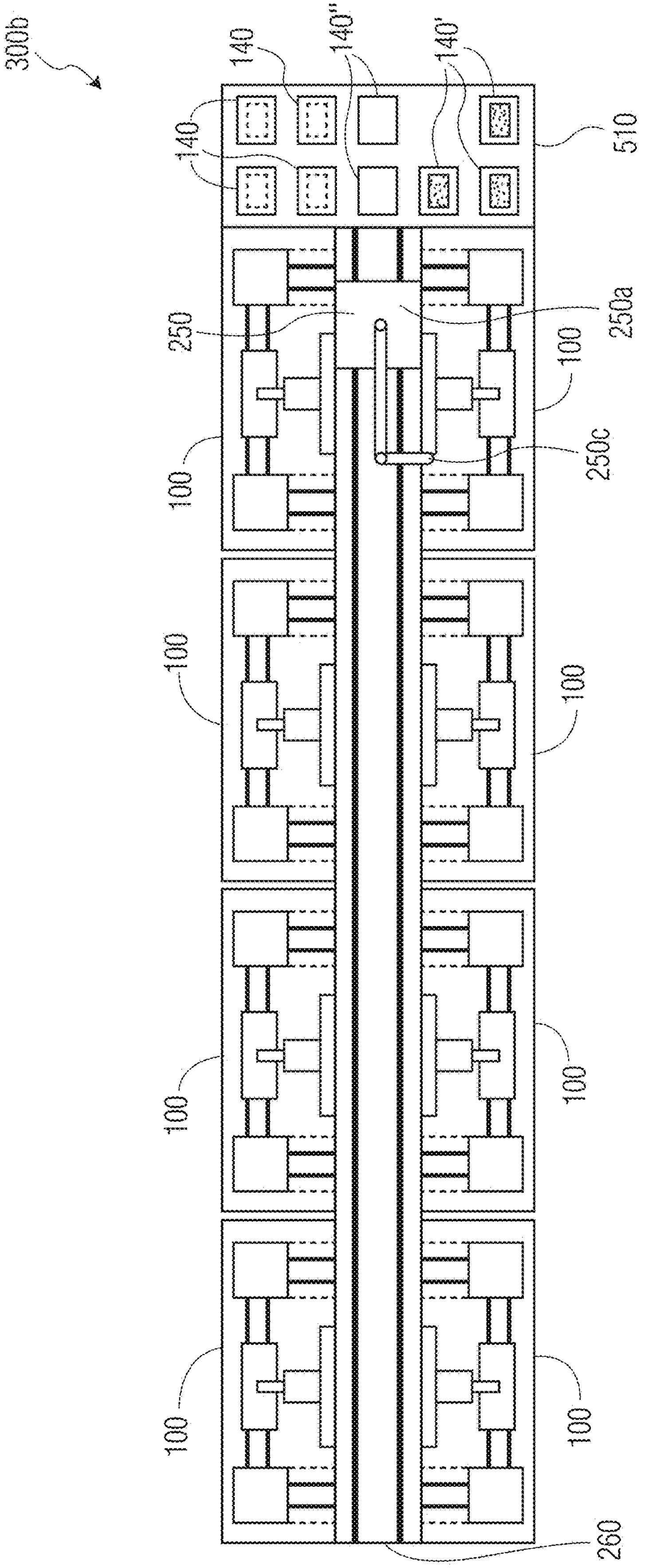

Although FIGS. 2A and 2B illustrate the plurality of wire bonding systems as including only two wire bonding systems in a back-to-back arrangement, the invention is not limited. FIG. 3A illustrates a wire bonding array 300*a* that includes a plurality of wire bonding systems 100 arranged in a single line with a material handling robot 250 running along the rear of the plurality of wire bonding systems 100 (e.g., the plurality of wire bonding systems may be against a wall). FIG. 3B illustrates another wire bonding array 300*b* that includes a plurality of wire bonding systems 100 arranged in two back-to-back lines with a material handling robot 250 running along the rear of each of the plurality of wire bonding systems 100, between each line. Although not illustrated, it is contemplated that the plurality of wire bonding systems may have any arrangement, including, for example, an arrangement wherein each of the plurality of wire bonding systems is angled relative to the direction of travel of the material handling robot, or a non-linear arrangement wherein the material handling robot has additional degrees of freedom.

Although FIGS. 2A, 2B, 3A, and 3B illustrate a robot support structure 260 (including robot support structures 260*a* and 260*b*) as sharing a footprint with the plurality of wire bonding systems (i.e., when viewed from above, robot support structure 260 covers part of the plurality of wire bonding systems 100), the invention is not so limited. The robot support structure and/or carriage need not be directly over the wire bonding systems to be within the scope of the invention. For example, the robot support structure and/or carriage could be located above a walkway between wire bonding systems.

In each of FIGS. 3A and 3B, wire bonding arrays 300*a* and 300*b* include a workpiece source 410 and 510, respectively. Each of workpiece source 410 and 510 is configured to store a plurality of workpieces (e.g., wherein the workpieces are held by a magazine, and workpiece sources 410 and 510 are configured to store a plurality of magazines). Workpiece sources 410 and 510 may include multiple levels of storage (e.g., shelves) or utilize organizational methods (e.g., each shelf may be designated for either input magazines/unprocessed workpieces, output magazines/processed workpieces, or empty magazines). Workpiece sources 410 and 510 are illustrated in a simplified form, it being understood that many magazines may be stored at workpiece sources 410 and 510.

Material handling robot 250 is configured to retrieve workpieces from workpiece source 410 in FIG. 3A and workpiece source 510 in FIG. 3B using robotic arm 250*c*, and then to provide workpieces to the input workpiece handling system of each of the plurality of wire bonding systems 100 using robotic arm 250*c*. Material handling robot 250 moves along robot support structure 260 via carriage 250*a*. During transit, material handling robot 250 may carry the workpieces in any manner (e.g., held with robotic arm 250*c*, on carriage 250*a*, etc.). Workpiece sources 410 and 510 are arranged within their respective wire bonding arrays such that material handling robot 250 can access all workpieces/magazines disposed therein (e.g., within reach of robotic arm 250*c*), though the invention is not so limited. As illustrated, workpiece sources 410 and 510 include input magazines 140 (illustrated with a dashed outline of a block representing unbonded workpieces), output magazines 140' (illustrated with a textured block representing bonded workpieces), and empty magazines 140" (illustrated with no block representing its emptiness). The illustration convention described in the prior sentence is consistent throughout the drawings.

Referring now to FIGS. 4A-4H, a wire bonding array 300*a* includes a plurality of wire bonding systems 100, a material handling robot 250, a robot support structure 260, and a workpiece source 410. FIGS. 4A-4H illustrate the plurality of wire bonding systems 100 in a single row configuration for ease and simplicity of illustration and explanation. As stated herein, it is contemplated that the invention could be used with any configuration of a plurality of wire bonding systems.

Figure 4A:
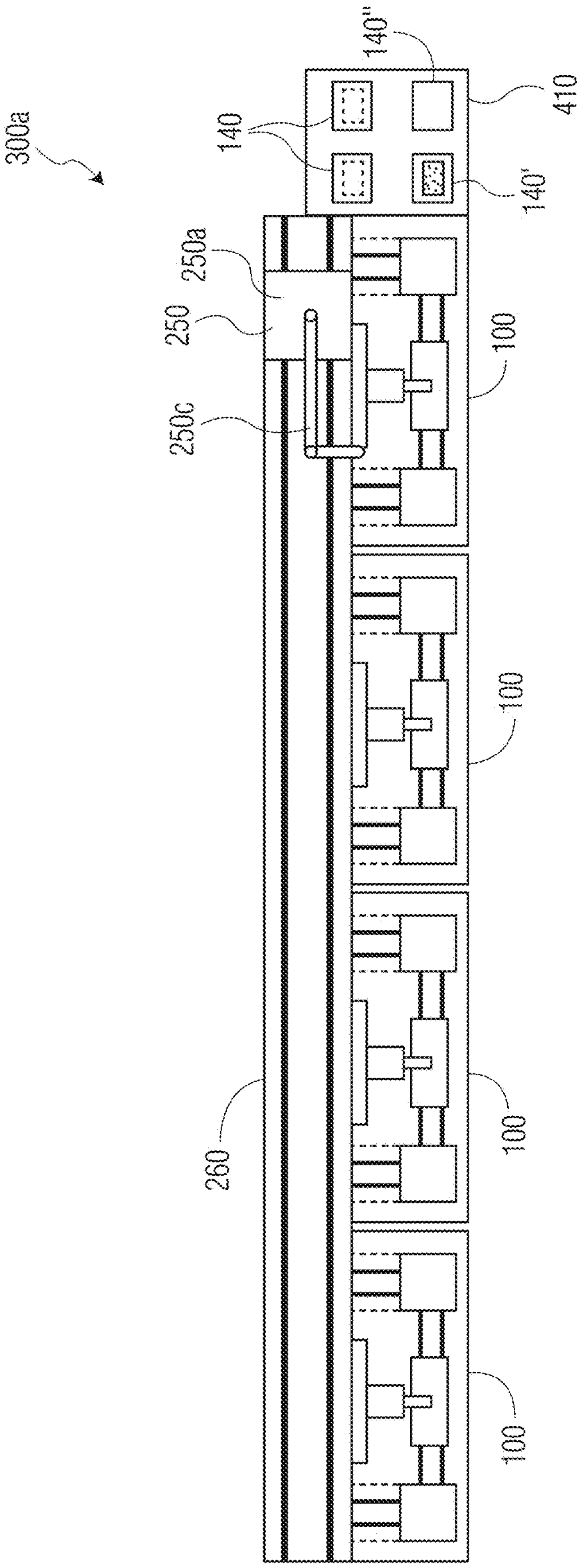
FIGS. 4A-4H are block diagram top views illustrating a method of operating a wire bonding array in accordance with an exemplary embodiment of the invention.
Figure 4B:
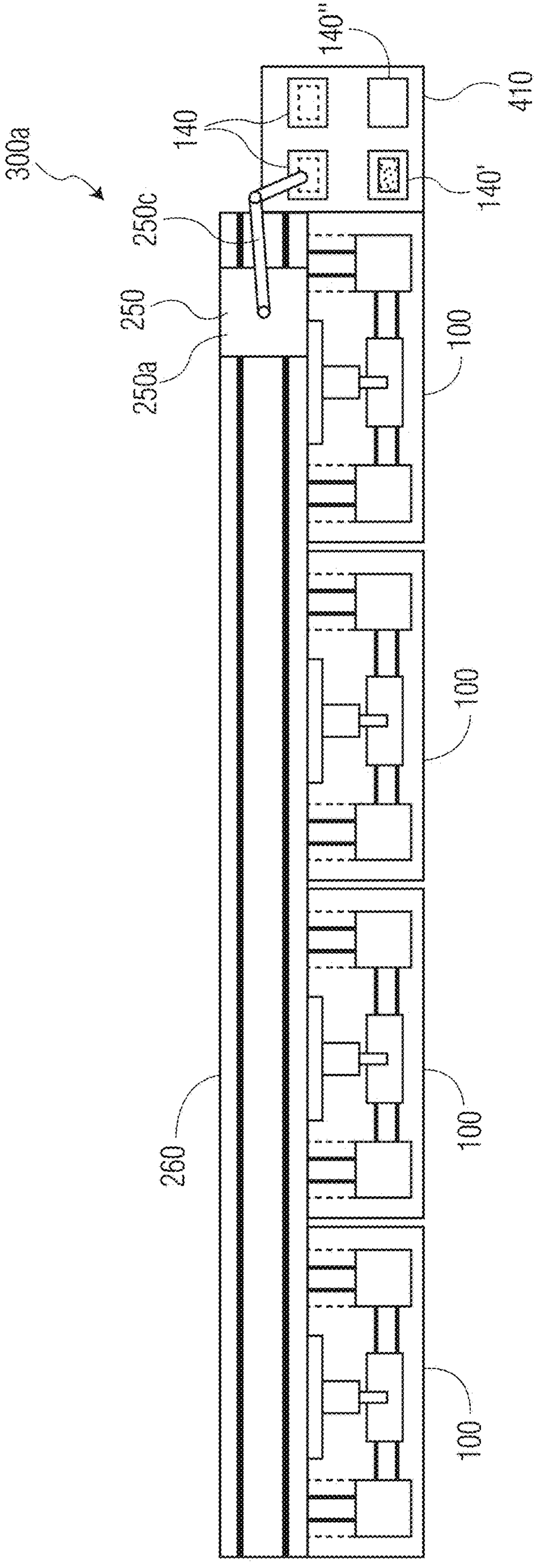
Figure 4C:
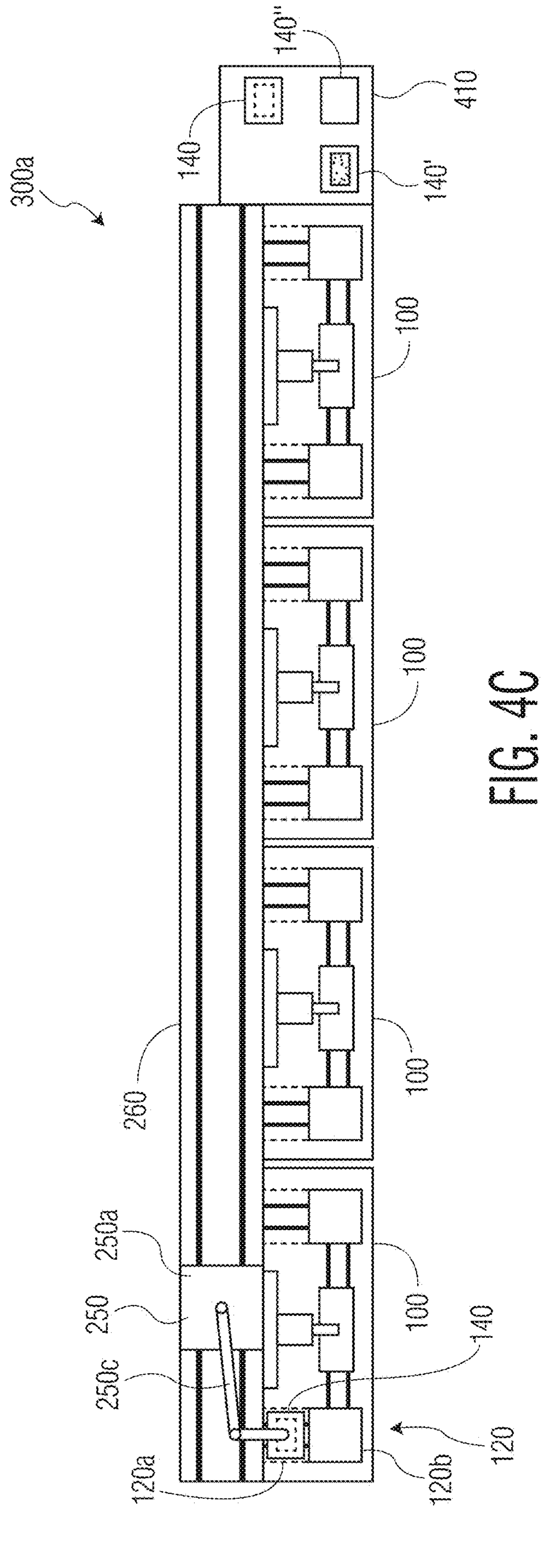

FIG. 4A illustrates wire bonding array 300*a* at an initial/startup condition. In FIG. 4B, material handling robot 250 engages an input magazine 140 with robotic arm 250*c* (e.g., using a gripper, a forklift, suction, a magnet, etc.). In FIG. 4C, material handling robot 250 has moved along robot support structure 260 via carriage 250*a* to a location proximate to one of the plurality of wire bonding systems 100. Additionally, material handling robot 250 has provided input magazine 140 to one of the plurality of wire bonding systems 100 and placed it on a receiving portion 120*a* of an input workpiece handling system 120 of wire bonding system 100. It is contemplated that material handling robot 250 may carry a magazine in any way. For example, robotic arm 250*c* may engage the magazine via a gripper, magnet, vacuum, etc. In another example, robotic arm 250*c* may place the magazine on carriage 250*a* prior to moving along robot support structure, then remove the magazine from carriage 250*a* prior to providing the magazine to the wire bonding system 100.

Figure 4D:
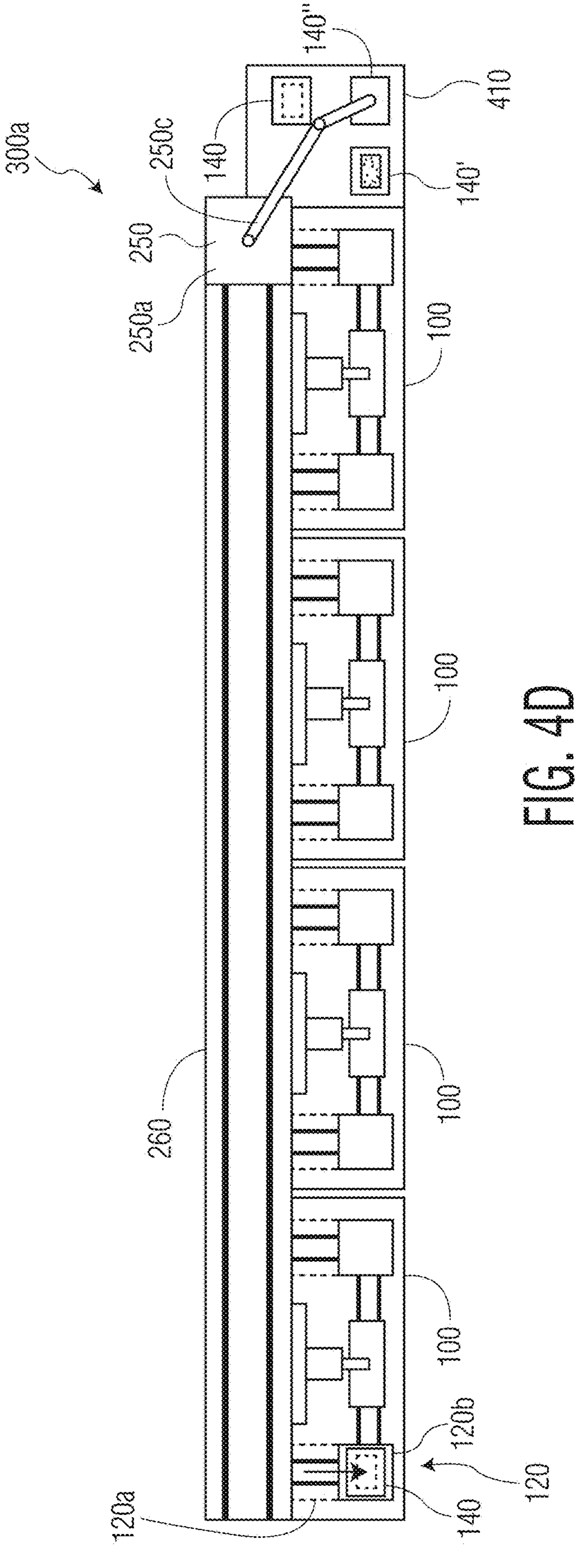
Figure 4E:
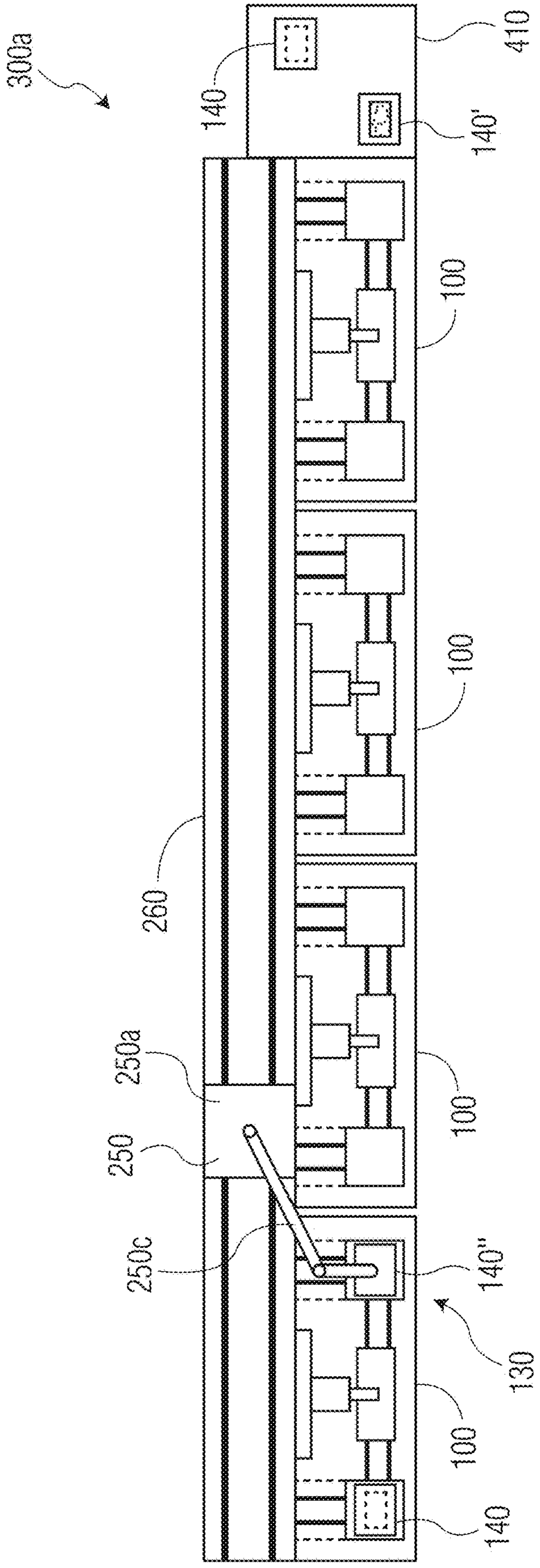

In FIG. 4D, receiving portion 120*a* has moved input magazine 140 into main portion 120*b* of input workpiece handling system 120 of a wire bonding system 100. Meanwhile, material handling robot 250 has returned to workpiece source 410 to acquire an empty magazine 140". FIG. 4E illustrates material handling robot 250 placing empty magazine 140" on output workpiece handling system 130 (e.g., wherein output workpiece handling system 130 raises/lowers empty magazine 140" as it adds bonded workpieces to empty magazine 140", which becomes an output magazine 140' in the process).

Figure 4F:
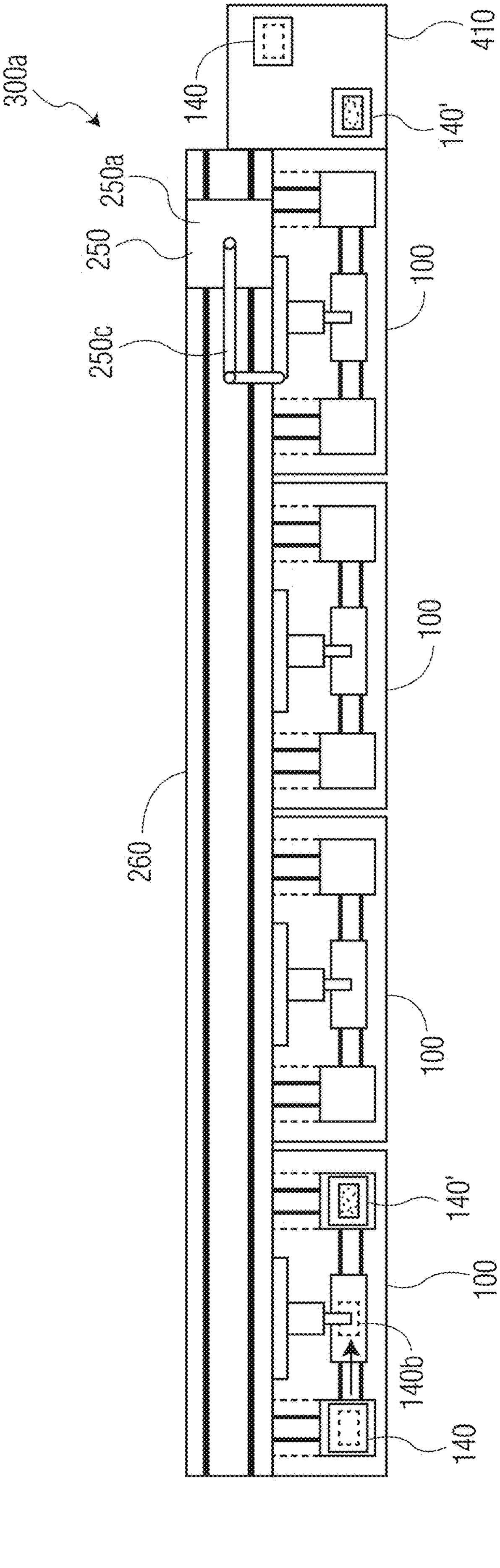

In FIG. 4F, a wire bonding process is underway (on the leftmost wire bonding system 100), wherein an active workpiece 140*b* is provided to support structure 102 of wire bonding system 100 by material handling system 112. After the wire bonding operation is completed on active workpiece 140*b*, active workpiece 140*b* will be moved to output magazine 140' (e.g., by material handling system 112).

Figure 4G:
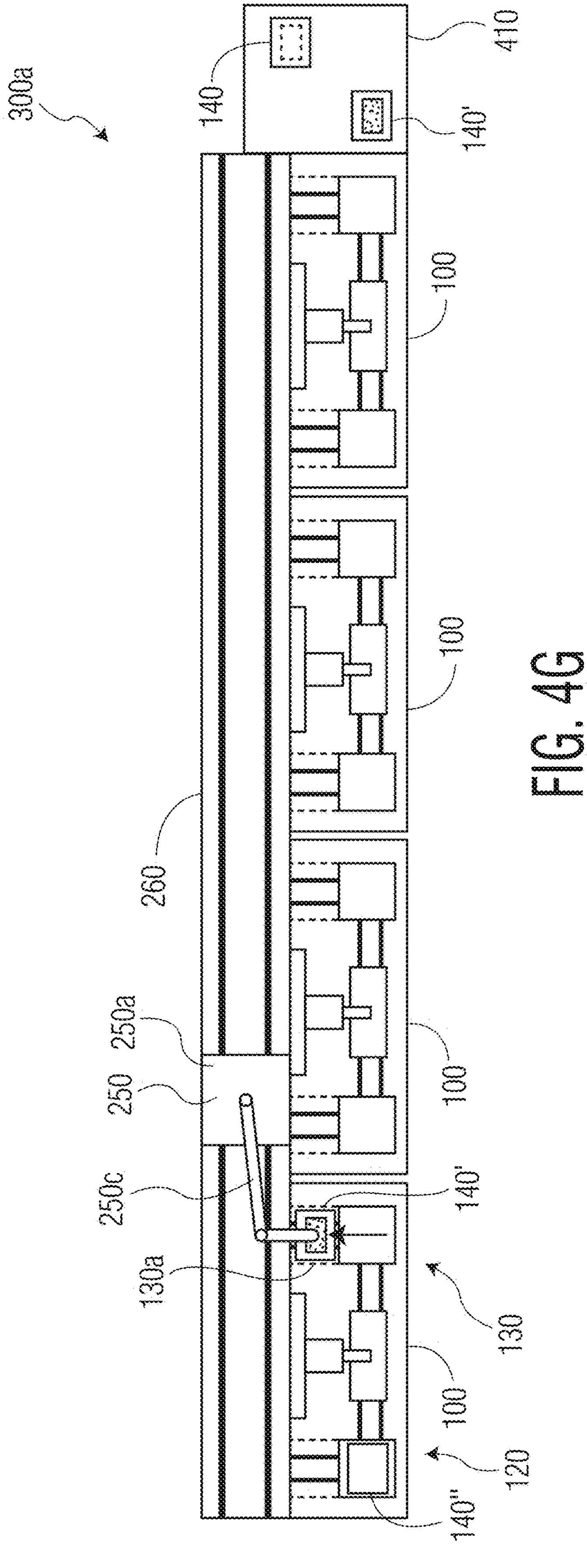
Figure 4H:
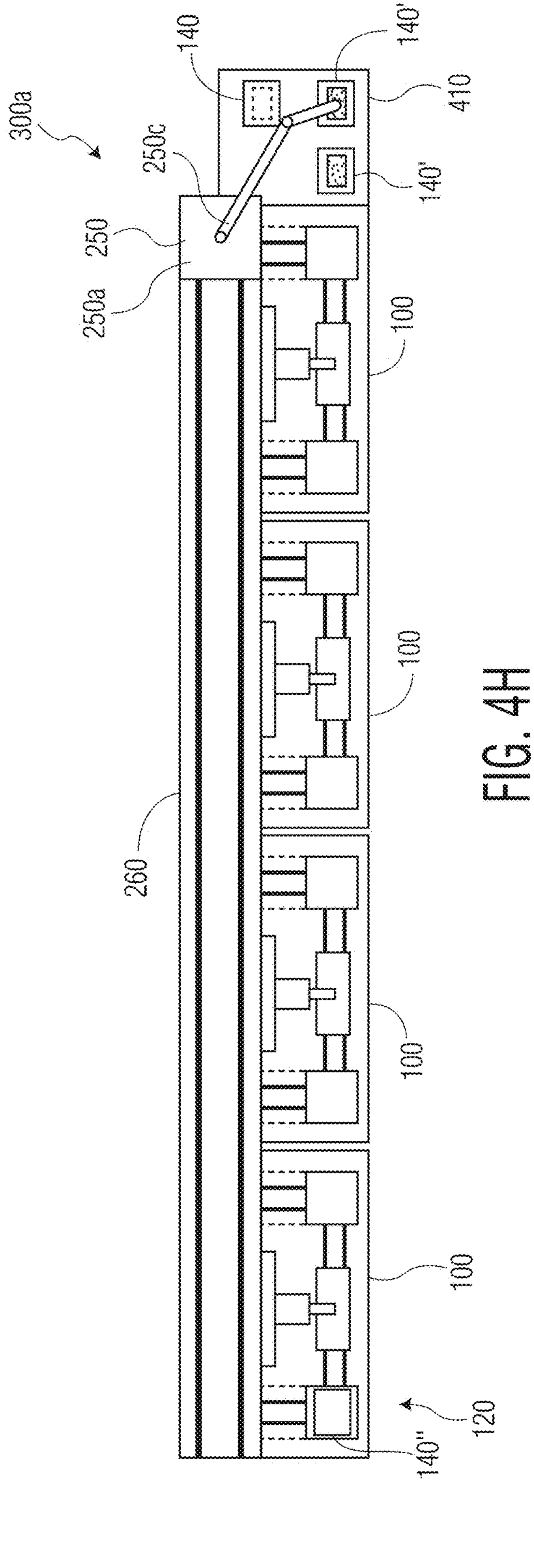

Similar to output magazine 140' being indexed as it is loaded with bonded workpieces, input magazine 140 may index upward/downward as it is emptied. Thus, FIG. 4G illustrates an empty magazine 140" on input workpiece handling system 120 (e.g., wherein all of the unbonded workpieces have been removed from input magazine 140, which is now empty magazine 140"). Additionally, output magazine 140' has been ejected from output workpiece handling system 130 onto buffer portion 130*a* of output workpiece handling system 130 so that it is accessible to robotic arm 250*c* of material handling robot 250 for removal from wire bonding system 100. In FIG. 4H, material handling robot 250 has moved output magazine 140' from wire bonding system 100 to workpiece source 410. Empty magazine 140" may be moved from input workpiece handling system 120 of wire bonding system 100 to output workpiece handling system 130 of the same wire bonding system 100, or to an output workpiece handling system of another of the plurality of wire bonding systems 100. Empty magazine 140" may also be placed on workpiece source 410 for later use or removal from wire bonding array 300*a*.

Figure 5:
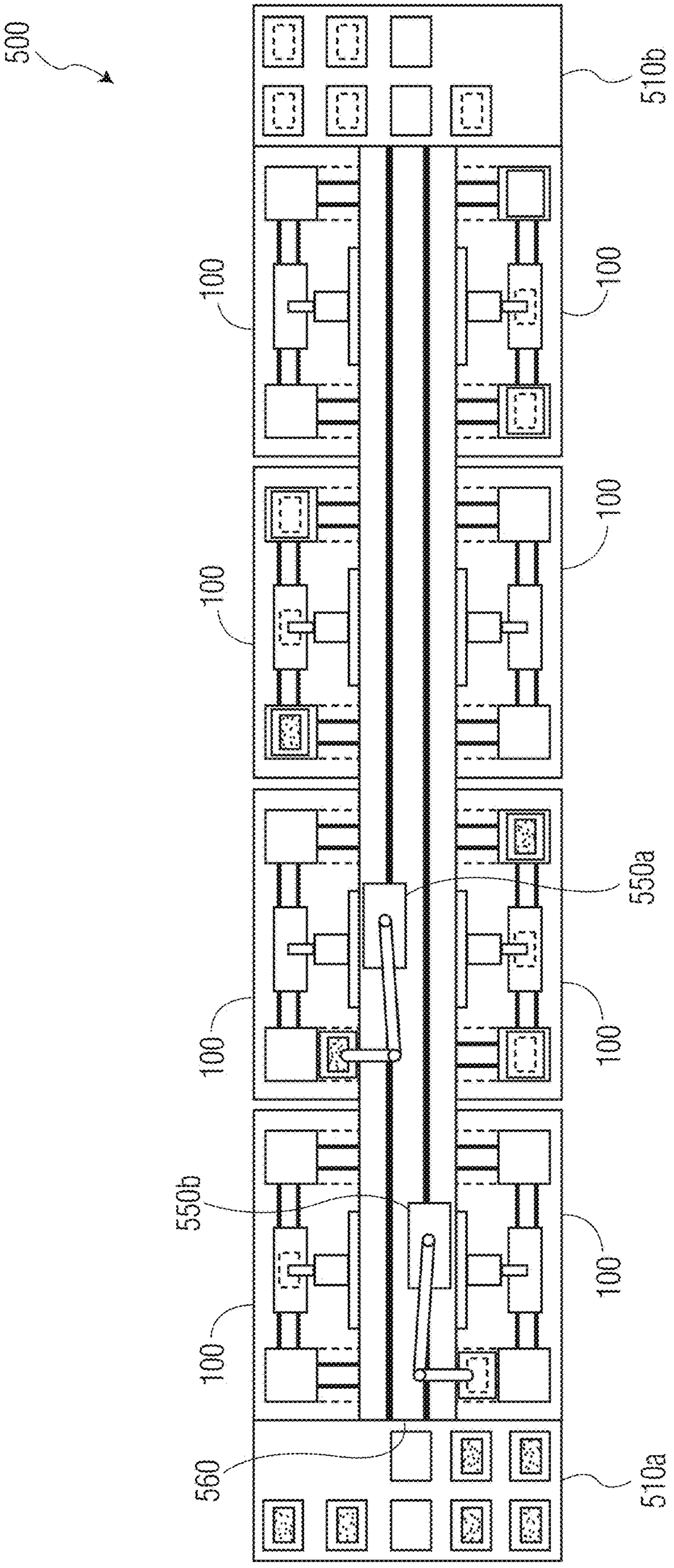
FIG. 5 is a block diagram top view illustrating a wire bonding array in accordance with another exemplary embodiment of the invention.

Although the invention has been illustrated and described above with respect to a single material handling robot, the invention is not limited to such. It is contemplated that a plurality of material handling robots could be used in accordance with the invention. For example, FIG. 5 illustrates an exemplary embodiment of a wire bonding array 500 including a plurality of material handling robots, including a material handling robot 550*a* and a material handling robot 550*b*.

Wire bonding array 500 also includes a plurality of wire bonding systems 100 arranged in a back-to-back configuration, a plurality of workpiece sources including a workpiece source 510*a* and a workpiece source 510*b*, and a material handling robot support structure 560. Members of the plurality of wire bonding systems 100 are illustrated in various states of processing. Each of the plurality of workpiece sources 510*a* and 510*b* are illustrated as serving different functions (e.g., where workpiece source 510*a* serves as an output for wire bonding array 500 and workpiece source 510*b* serves as an input to wire bonding array 500). However, the invention is not limited to such, as the plurality of workpiece sources 510*a* and 510*b* could be used in any desirable organization system and still be within the scope of the invention. The number of workpiece sources is not limited.

Similarly, each of the plurality of material handling robots 550*a* and 550*b* could serve the same function (e.g., each providing full functionality of providing and removing workpieces/magazines to and from each wire bonding system 100) or different functions (e.g., one provides workpieces/magazines and the other removes workpieces/magazines from the plurality of wire bonding systems 100, or one serves a portion of wire bonding array 500, and the other serves another portion of wire bonding array 500, etc.). Although FIG. 5 illustrates the plurality of material handling robots as including two material handling robots, the invention is not limited, as the plurality could include additional material handling robots.

Although input workpiece handling system 120, output workpiece handling system 130, and material handling system 112 are shown as including rails, the invention is not so limited. The invention may be used with any type of material handling system, including material handling systems of various geometries and utilizing grippers, conveyer belts, ramps, etc.

Although the invention has been illustrated and described with respect to a material handling robot supported by a rail, the invention is not intended to be limited to such. It is contemplated that the material handling robot may be supported by any structure known to those skilled in the art (e.g., wheels/castors, a cable-suspension system, magnetic suspension systems, etc.).

Although the invention has been illustrated and described with respect to a material handling robot serving a wire bonding array (e.g., a plurality of wire bonding systems), the invention is not intended to be limited to such. It is contemplated that a material handling robot including a carriage that is above a receiving portion of a wire bonding system serve only a single wire bonding system.

Although the invention has been illustrated and described with respect to a material handling robot serving a wire bonding array, the invention is not so limited. It is contemplated that an elevated material handling robot for providing workpieces as described herein could serve any process in the semiconductor packaging industry (e.g., die attach systems/arrays, encapsulation systems/arrays, or any other system known in the art).

Although the invention has been illustrated and described with respect to a material handling robot including a robotic arm, the invention is not so limited. It is contemplated that any robotic structure may be used in connection with engaging/grabbing/holding a plurality of workpieces (e.g., in a magazine).

Although the invention has been illustrated and described as having a particular type of input and output workpiece handling system (e.g., including a receiving portion, configured to receive empty magazines via the top of the workpiece handling system, having a particular arrangement on a wire bonding system, etc.), the invention is not so limited. It is contemplated that the invention would work with any conceivable workpiece handling system (e.g., each magazine may be loaded and unloaded from the top of a workpiece handling system, workpieces may be loaded back into the input magazine after they are bonded, etc.).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A wire bonding array comprising:

a plurality of wire bonding systems, each of the plurality of wire bonding systems including (i) an input workpiece handling system and (ii) a bond head assembly configured to carry a wire bonding tool; and a robot configured to provide workpieces to the input workpiece handling system of each of the plurality of wire bonding systems, the robot including a carriage for moving with respect to the plurality of wire bonding systems, the carriage being positioned above a receiving portion of the input workpiece handling system, wherein a footprint of the carriage overlaps a portion of a footprint of the plurality of wire bonding systems.

2. The wire bonding array of claim 1 wherein each of the plurality of wire bonding systems includes an output workpiece handling system, the robot being configured to remove workpieces from the output workpiece handling system.

3. The wire bonding array of claim 1 wherein the input workpiece handling system is a magazine handler, and workpieces are provided by the robot in a magazine to the magazine handler.

4. The wire bonding array of claim 3 wherein the robot is a multi-axis robot configured to grip the magazine prior to providing the magazine to the magazine handler.

5. The wire bonding array of claim 1 further comprising a robot support structure, the carriage being configured to move with respect to the plurality of wire bonding systems along the robot support structure.

6. The wire bonding array of claim 5 wherein the robot support structure includes a rail.

7. The wire bonding array of claim 1 further comprising a workpiece source, the robot being configured to retrieve workpieces from the workpiece source, and then to provide workpieces to the input workpiece handling system of each of the plurality of wire bonding systems.

8. The wire bonding array of claim 1 wherein the robot includes a 6-axis cobot.

9. A wire bonding array comprising:

a plurality of wire bonding systems, each of the plurality of wire bonding systems including (i) an input magazine handler, (ii) an output magazine handler; and (iii) a bond head assembly configured to carry a wire bonding tool;

a robot configured to (i) provide magazines including workpieces to the input magazine handler of each of the plurality of wire bonding systems and (ii) remove magazines including workpieces from the output magazine handler, the robot including a carriage for moving with respect to the plurality of wire bonding systems, the carriage being positioned above a receiving portion of the input magazine handler; and a robot support structure, the carriage being configured to move with respect to the plurality of wire bonding systems along the robot support structure, wherein a footprint of the carriage overlaps a portion of a footprint of the plurality of wire bonding systems.

10. The wire bonding array of claim 9 wherein the robot is a multi-axis robot configured to grip magazines to provide magazines including workpieces to the input magazine handler.

11. The wire bonding array of claim 9 wherein the robot support structure includes a rail.

12. The wire bonding array of claim 9 further comprising a workpiece source, the robot being configured to retrieve magazines including workpieces from the workpiece source, and then to provide magazines including workpieces to the input magazine handler of each of the plurality of wire bonding systems.

13. The wire bonding array of claim 9 wherein the robot includes a 6-axis cobot.

14. A wire bonding array comprising:

a plurality of wire bonding systems, each of the plurality of wire bonding systems including (i) an input magazine handler, (ii) an output magazine handler; and (iii) a bond head assembly configured to carry a wire bonding tool;

a robot configured to (i) provide magazines including workpieces to the input magazine handler of each of the plurality of wire bonding systems and (ii) remove magazines including workpieces from the output magazine handler, the robot including a carriage for moving with respect to the plurality of wire bonding systems, the carriage being positioned above a receiving portion of the input magazine handler; and a robot support structure, the carriage being configured to move with respect to the plurality of wire bonding systems along the robot support structure, wherein the robot support structure is disposed between the plurality of wire bonding systems.

15. The wire bonding array of claim 14 wherein a portion of the robot support structure runs under the plurality of wire bonding systems.

16. A wire bonding array comprising:

a plurality of wire bonding systems, each of the plurality of wire bonding systems including (i) an input magazine handler, (ii) an output magazine handler; and (iii) a bond head assembly configured to carry a wire bonding tool;

a robot configured to (i) provide magazines including workpieces to the input magazine handler of each of the plurality of wire bonding systems and (ii) remove magazines including workpieces from the output magazine handler, the robot including a carriage for moving with respect to the plurality of wire bonding systems, the carriage being positioned above a receiving portion of the input magazine handler; and a robot support structure, the carriage being configured to move with respect to the plurality of wire bonding systems along the robot support structure, wherein the robot support structure is suspended from a ceiling of a factory housing the plurality of wire bonding systems.

17. A wire bonding array comprising:

a plurality of wire bonding systems, each of the plurality of wire bonding systems including (i) an input workpiece handling system and (ii) a bond head assembly configured to carry a wire bonding tool;

a robot configured to provide workpieces to the input workpiece handling system of each of the plurality of wire bonding systems, the robot including a carriage for moving with respect to the plurality of wire bonding systems, the carriage being positioned above a receiving portion of the input workpiece handling system; and a robot support structure, the carriage being configured to move with respect to the plurality of wire bonding systems along the robot support structure, wherein the robot support structure is disposed between the plurality of wire bonding systems.

18. The wire bonding array of claim 17 wherein a portion of the robot support structure runs under the plurality of wire bonding systems.

19. A wire bonding array comprising:

a plurality of wire bonding systems, each of the plurality of wire bonding systems including (i) an input workpiece handling system and (ii) a bond head assembly configured to carry a wire bonding tool;

a robot configured to provide workpieces to the input workpiece handling system of each of the plurality of wire bonding systems, the robot including a carriage for moving with respect to the plurality of wire bonding systems, the carriage being positioned above a receiving portion of the input workpiece handling system; and a robot support structure, the carriage being configured to move with respect to the plurality of wire bonding systems along the robot support structure, wherein the robot support structure is suspended from a ceiling of a factory housing the plurality of wire bonding systems.

20. The wire bonding array of claim 19 wherein the plurality of wire bonding systems are arranged back-to-back such that a distance between the backs of the plurality of wire bonding systems is eliminated.

* * * * *